United States Patent [19]
Koeber et al.

[11] Patent Number: 5,402,028
[45] Date of Patent: Mar. 28, 1995

[54] STATOR FOR AN ELECTRIC MACHINE

[75] Inventors: Karl-Ernst Koeber, Groetzingen; Siegmund Radke, Leinfelden-Echterdingen; Hans Fay, Wendlingen, all of Germany

[73] Assignee: Robert Bosch GmbH, Stuttgart, Germany

[21] Appl. No.: 39,354

[22] PCT Filed: Nov. 13, 1991

[86] PCT No.: PCT/DE91/00880
§ 371 Date: Apr. 22, 1993
§ 102(e) Date: Apr. 22, 1993

[87] PCT Pub. No.: WO92/10020
PCT Pub. Date: Jun. 11, 1992

[30] Foreign Application Priority Data

Nov. 29, 1990 [DE] Germany ............... 40 37 953.1

[51] Int. Cl.$^6$ ............................................. H02K 1/12
[52] U.S. Cl. ................................. 310/259; 310/42; 310/216; 310/217
[58] Field of Search ......... 310/216, 217, 218, 40 MM, 310/42, 254, 259, 49 R, 162; 336/210; 29/596

[56] References Cited

U.S. PATENT DOCUMENTS

| | | | |
|---|---|---|---|
| 2,487,258 | 11/1949 | Morris | 310/216 UX |
| 2,712,084 | 6/1955 | Bridenbaugh | 310/254 UX |
| 3,443,137 | 5/1969 | McElroy | 310/216 |
| 3,502,922 | 3/1970 | Welker | . |
| 3,694,903 | 10/1972 | Deming | 29/596 |
| 3,826,941 | 7/1974 | Folmar | . |

FOREIGN PATENT DOCUMENTS

| | | |
|---|---|---|
| 0154469 | 9/1985 | European Pat. Off. . |
| 149506 | 3/1904 | Germany . |
| 875227 | 4/1953 | Germany . |

Primary Examiner—R. Skudy
Attorney, Agent, or Firm—Michael J. Striker

[57] ABSTRACT

The stator for an electric machine has a two-part stator laminate stack for mounting a stator winding consisting of two laminated stack parts (21,22) having a self-centering device. The laminated stack parts each consist of a plurality of laminations (11) and the self-centering device consists of a plurality of locking joints (18,19), each of the locking joints consisting of a tab (23) having a first locking element (47) integrally formed on one lamination (11) and a receptacle (24) with a second locking element (48) recessed in another lamination (11) connected to the lamination (11) having the tab (23) projecting into the receptacle (24) in a plug-in direction. The first locking elements (47) and second locking elements (48) are formed so that the first locking elements (47) are gripped by the second locking elements (48) nearly transversely to the respective plug-in directions so that a plurality of receptacles (24) engaged with tabs (23) of the laminations (11) bearing against one another in an axial direction are permanently deformed transversely to the plug-in direction so that contours (31) of the receptacles (24) so engaged project beyond contours (31) of nondeformed receptacles (24) in adjacent laminations (11).

7 Claims, 5 Drawing Sheets

1

STATOR FOR AN ELECTRIC MACHINE

BACKGROUND OF THE INVENTION

The invention proceeds from a stator for an electric machine, in particular a small-power electric motor.

In a known stator of this type for a bipolar low-power motor, the two laminate stack parts are constructed symmetrically and each carry a magnet pole. Extending from each magnet pole are two limbs which form the magnetic return path and abut in the plane of symmetry of the stator via reciprocal V-shaped centering devices. After mounting the stator winding, which is subdivided into two field coils, on one of the magnet poles in each case, the two laminate stack parts are joined together in the V-shaped centring devices and welded along the joint in the plane of symmetry. The welding operation represents, on the one hand, an important cost factor in the production of the stator, and on the other hand has the disadvantage that the welded joint forms a bridge among the individual mutually insulated laminations, and this leads to magnetic flux loss and thus to power loss.

SUMMARY OF THE INVENTION

According to the present invention, the stator for the electric machine, particularly a low-power motor, has a two-part stator laminate stack for mounting a stator winding consisting of two laminated stack parts having a self-centering device. The laminated stack parts each consist of a plurality of laminations and the self-centering device consists of a plurality of locking joints, each of the locking joints consisting of a tab having a first locking element integrally formed on one lamination and a receptacle with a second locking element recessed in another lamination connected to the lamination having the tab projecting into the receptacle in a plug-in direction. The first locking elements and second locking elements are formed so that the first locking elements are gripped by the second locking elements nearly transversely to the respective plug-in directions so that a plurality of receptacles engaged with tabs of the laminations bearing against one another in an axial direction are permanently deformed transversely to the plug-in direction so that contours of the receptacles so engaged project beyond contours of nondeformed receptacles in adjacent laminations.

The stator according to the invention has the advantage of a cost-effective production without being attended by the former disadvantages. The locking connection is performed via the individual laminations and can be realised simply using stamping technology. No additional parts or additional materials are required for joining the two laminate stack parts.

The stator is mounted by applying to the two laminate stack parts, which have been previously abutted at the joint, a force which is directed in the joining direction of the tabs and receptacles. During the joining operation, at least one of the two limbs of the laminations enclosing the receptacle is pressed outwards by the locking profile projecting laterally over the tab, and after the second locking element, which is constructed on this limb, in the receptacle has been gripped from behind by the first locking element on the tab springs back into its original position. The locking is thus performed, and the two laminate stack parts are joined inseparably to one another, The locking joint can be disconnected once again in the original joining direction only by destroying the workpiece.

Advantageous developments and improvements of the stator are possible by means of further measures.

In accordance with a preferred embodiment of the invention, the locking elements are constructed in such a way that the gripping from behind of the second locking profile in the receptacle by the first locking element on the tab is performed with pretensioning. In this way, the two laminations, belonging in each case to one laminate stack part, bear against one another in a force-locked fashion, and this is advantageous for the stability of the stator.

Depending on the design of the stator (symmetrical with two thin limbs or asymmetrical with only one relatively thick limb between the magnet poles), one locking joint is provided in each limb or two adjacent locking joints are provided in the single limb. The locking joints are designed in this case reciprocally, that is to say each lamination has a receptacle and a tab which corresponds in each case to the tab or the receptacle of the lamination in the other laminate stack part.

If the stator winding is constructed as a coil seated on the single limb or as two coils seated in each case on one of the two limbs, in accordance with a preferred embodiment of the invention the locking joints are arranged in the limb or in the limbs in such a way that they are situated inside the limb region enclosed by the coil or coils, being situated in this case, for example, in the center of the limb region or eccentrically. In this construction, the coils enclosing the limbs with their coil insulating frames take over the prevention of the two laminate stack halves from relative axial displacement along the dividing plane in the locking joints.

If the stator winding is formed by a plurality of coils, which are in each phase wound on a magnet pole of the stator, some of the receptacles with plug-in tabs of the laminations bearing against one another in the axial direction are permanently deformed transverse to the direction of the lined-up arrangement of the laminations and to the joining direction of the receptacles and tabs, specifically in such a way that the contours of the deformed receptacles project at least slightly beyond the contours of the non-deformed receptacles. It is likewise prevented in this way that the two joined-together laminate stack parts can be displaced with respect to one another inside the locking joints along their dividing line.

BRIEF DESCRIPTION OF THE DRAWINGS

The invention is explained in more detail in the following description with the aid of exemplary embodiments represented in the drawing, wherein.

DETAILED DESCRIPTION OF THE PREFERRED EMBODIMENTS

Figure 1:
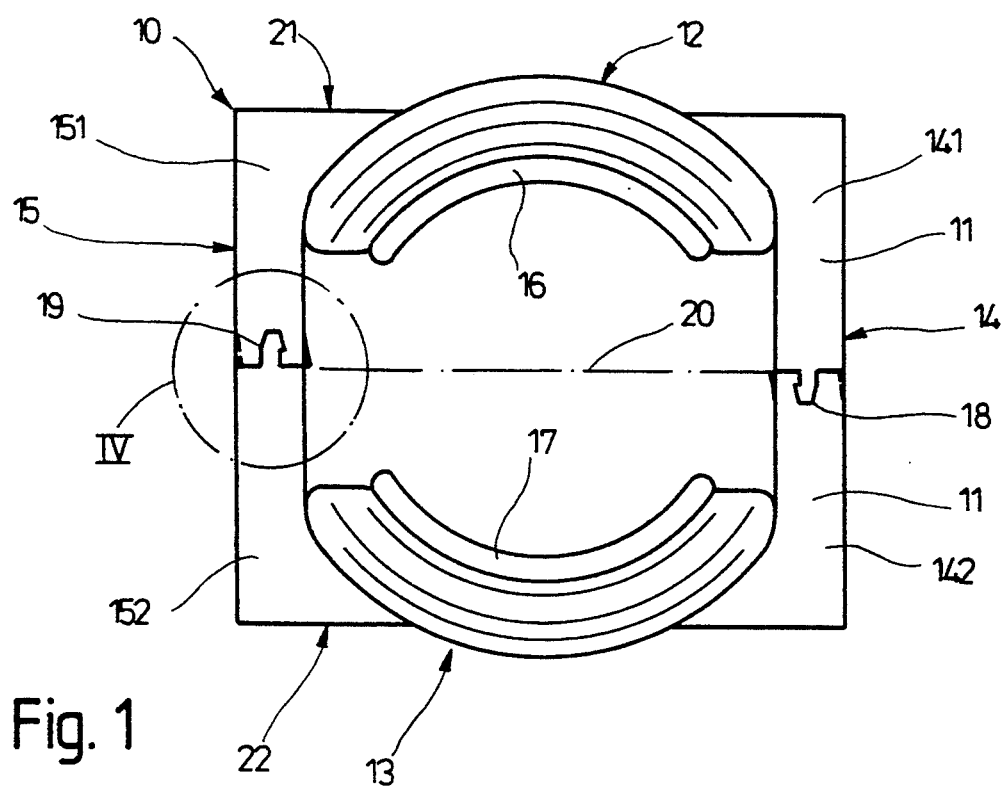
FIG. 1 shows a front view of a stator according to the invention with a stator winding for a bipolar small-power motor, represented diagrammatically, FIGS. 2 and 3 each are cross-sectional views of other embodiments of a stator with a stator winding for a bipolar small-power motor in a symmetrical design (FIG. 2) and an asymmetrical design (FIG. 3), respectively, represented diagrammatically in each case.

The stator represented diagrammatically in front view in FIG. 1 for a bipolar low-power motor as an exemplary embodiment of electric machine has a stator laminate stack 10 made from a multiplicity of laminations 11 of the same sheet-metal section which bear against one another in an insulated fashion in the axial direction. By appropriate configuration of the sheet-metal section, two diametrically opposed magnet poles 12, 13 are constructed which are joined to one another via two limbs 14, 15 forming magnetic return path. The stator winding consists of two coil windings 16, 17 which in each case are wound onto one of the two magnet poles 12, 13.

In order to mount the coil windings 16, 17, the stator is longitudinally split so that there are two symmetrically constructed laminate stack parts 21, 22, whose dividing plane 20 extends through the center of the two limbs 14, 15 and subdivides the latter in each case into two limb halves 141, 142 and 151, 152, respectively. Along this dividing plane 20, the two laminate stack parts 21, 22 are joined together by two locking joints 18, 19 which simultaneously cause centering of the two laminate stack parts 21, 22 by self-locking. The locking joints 18, 19 consist in this case of a multiplicity of individual locking elements on the laminations 11, so that in each case the two laminations 11, abutting within the laminate stack 10 along the dividing plane 20, are locked with one another in the two laminate stack parts 21, 22.

Figure 4:
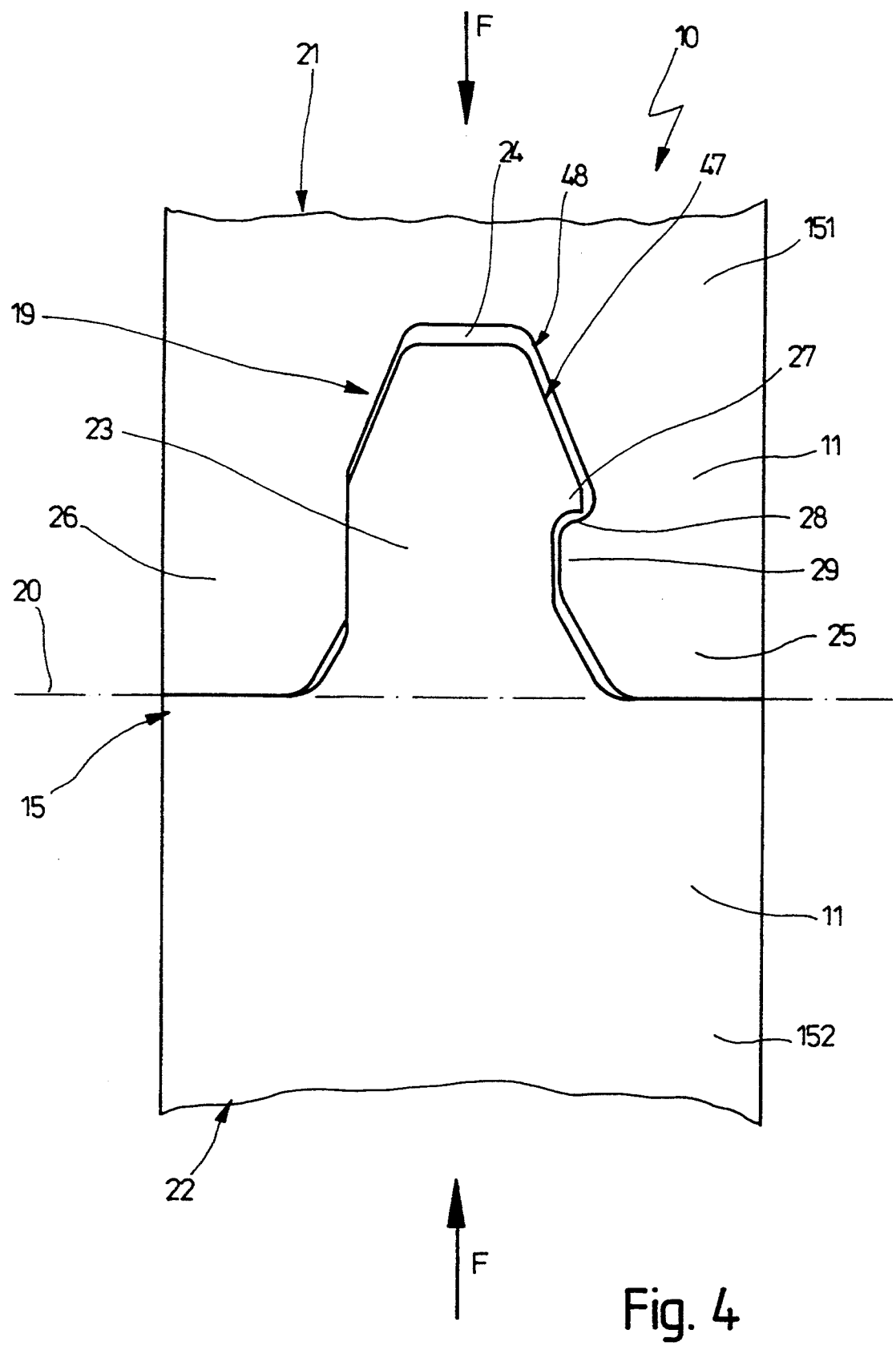
FIG. 4 is a cutaway detailed cross-sectional view of the portion of the stator shown in the dot-dashed circle IV of FIG. 1.

FIG. 4 is a detailed view of the locking joint 19 in the limb 15 of the laminate stack 10. Constructed on each lamination 11 associated with the laminate stack part 22 is a tab 23 which projects in the plug-in direction of the lamination 11 and carries a first locking element 47, a projecting shoulder. Recessed in each lamination 11 associated with the laminate stack part 21 is a receptacle 24 which carries a second locking element 48, a corresponding recess, which corresponds to the first locking element 47 and is gripped by the first locking element 47 transverse to the plug-in direction. The two locking elements 47, 48 can be constructed in this case in such a way that the gripping is performed with pretensioning, so that the two laminations 11 bear against one another in a force-locked fashion along the dividing plane 20. By stamping, the receptacle 24 from the lamination 11, the latter is given in this region two end-side limbs 25, 26 which have a certain elasticity, so that upon insertion of the tab 23 into the receptacle 24 they can spread in order thereafter to spring back again into their original position.

In the exemplary embodiment of the locking joint 19 in accordance with FIG. 4, the first locking element 47 on the tab 23 has at least one locking nose 27 projecting transverse to the plug-in direction beyond the tab 23, and the second locking element 48 on the receptacles 24 has at least one locking shoulder 28 which corresponds to the locking nose and is constructed on a projection 29 of the limb 25 which projects into the receptacle 24.

The locking joint 18 in the limb 14 is constructed in an identical fashion to the locking joint 19 and is merely arranged rotated by 180°, which means that in the region of the limb 14 the laminations 11 belonging to the laminate stack part 21 additionally further have a tab, identical to the tab 23, and the laminations 12 belonging to the laminate stack 22 additionally have a receptacle, identical to the receptacle 24. Each lamination 11 is thus provided with a tab 23 and a receptacle 24 which in each case are situated in one of the two limb sections of the laminations 11.

The stator described above in accordance with FIG. 1 is mounted as follows: the laminations 11 produced in a stamping process from insulating sheet with tabs 23 and receptacles 24 are assembled in a known way to form the two laminate stack parts 21, 22. Thereafter, the two laminate stack parts 21, 22 are placed against one another, specifically in such a way that the tabs 23 and the receptacles 24 of the individual laminations 11 are aligned opposite one another in the two laminate stack parts 21, 22. Thereafter, there are applied to the two laminate stack parts 21, 22 in the plug-in direction compressive forces F which are directed towards one another and are of a magnitude such that the tabs 23 of all the laminations 11 penetrate into the receptacles 24 accompanied by elastic expansion of the limbs 25 until the locking noses 27 have passed the projection 29 and the limbs 25 spring back, so that the locking noses 27 grip behind the locking shoulders 28. Locking of the two laminate stack parts 21, 22 is thereby performed. It is no longer possible for the two laminate stack parts 21, 22 to be pulled apart.

Figure 5:
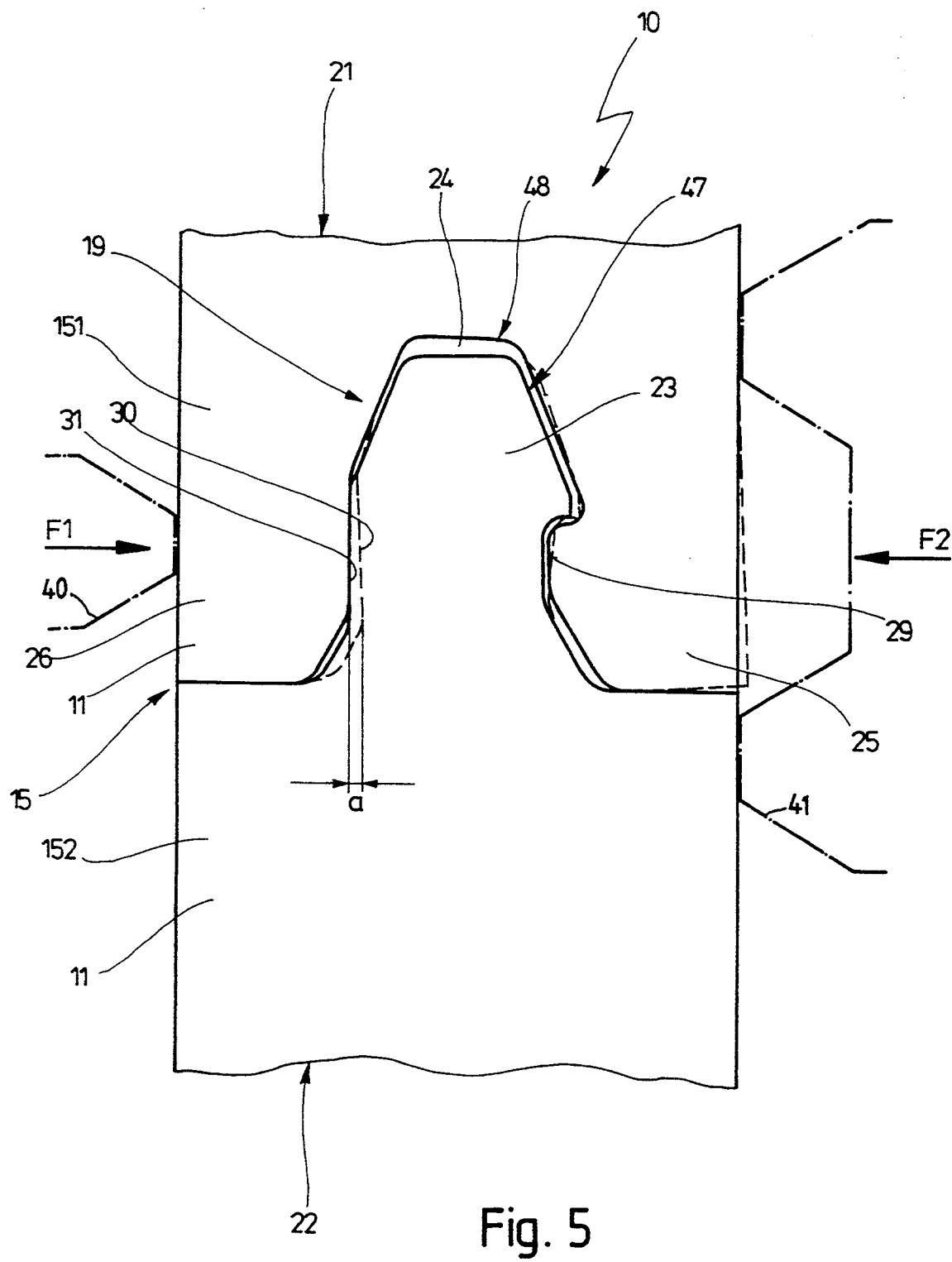
FIG. 5 is a detailed cross-sectional view of the device shown in FIG. 4 illustrating the manner in which the caulking operation is performed.

In order to protect the two laminate stack parts 21, 22 against relative axial displacement along the dividing plane 20, lateral deforming the end-side limbs is further performed in the region of the receptacles 24 in the limb half 151 or 142. As represented in FIG. 5 for the limb half 151, for this purpose a deforming tool 40 is applied laterally outside to the limb half 151 transverse to the joining axis of the locking joint 19. A support tool 41 is applied to the opposite limb side of the limb 15. A deforming force F1 is now applied to the deforming tool 40, the counterholding being performed by the force F2 via the support tool 41. In this operation, some of the limbs 26 of the laminations 11 are pressed inwards, the receptacles 24 with plugged-in tabs 23 being permanently deformed transversely toward the joining axis with the axial sequence of the laminations 11, remaining specifically in such a way that the contours 30 of the deformed receptacles 24 project by an excess distance a beyond the contours 31 of the non-deformed receptacles 24 in adjacent laminations 11. This operation of deforming is carried out at different points of the limb half 151 which are situated at an axial spacing from one another. The same deforming operation is carried out on the limb 14, the deforming tool 40 being applied to the limb half 142.

Figure 2:
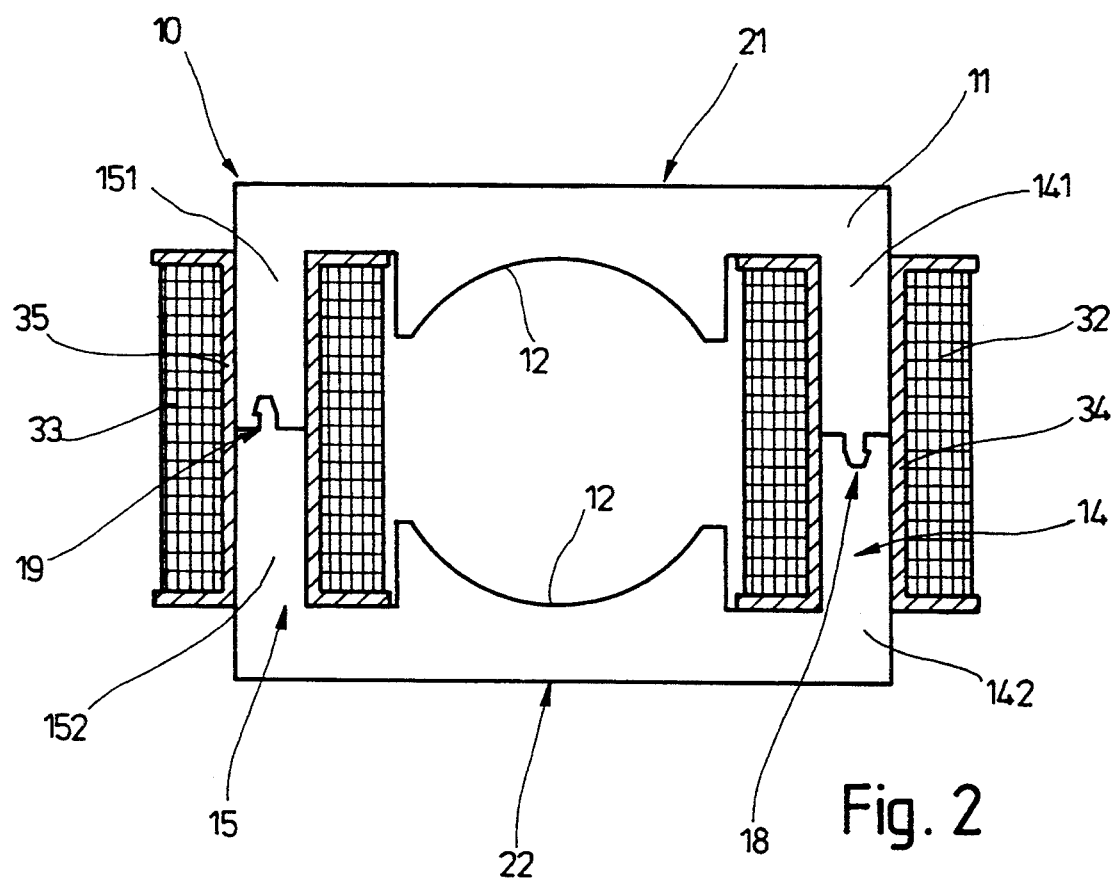

A further exemplary embodiment of a stator for a bipolar low-power motor is represented in cross-section in FIG. 2. This stator differs from the stator described in relation to FIG. 1 in that here the stator winding is designed as cylindrical coils 32, 33 which are wound on a coil insulating frame 34, 35 with a hollow box profile and in each case enclose one of the two limbs 14, 15. In order to mount the stator, the two coil insulating frames 34, 35 with cylindrical coils 32, 33 are first slipped over the two limb halves 142, 152 of the laminate stack part 21, and then the second laminate stack part 22 with its limb halves 141, 151 is inserted into the coil insulating frames 34, 35. By applying a compressive force F directed transverse to the dividing plane 20 (FIG. 4), the tabs 23 on the individual laminations 11 are again inserted into the receptacles 24, and thus the two locking joints 18, 19 are produced. Deformation of the locking joint 18, 19 to prevent relative axial displacement of the two laminate stack parts 21, 22 is eliminated here, since the coil insulating frames 34, 35 enclosing the limbs 14, 15 prevent such axial displacement. For the rest, the stator represented in FIG. 2 agrees with that in FIG. 1, so that identical components are provided with identical reference symbols.

Figure 3:
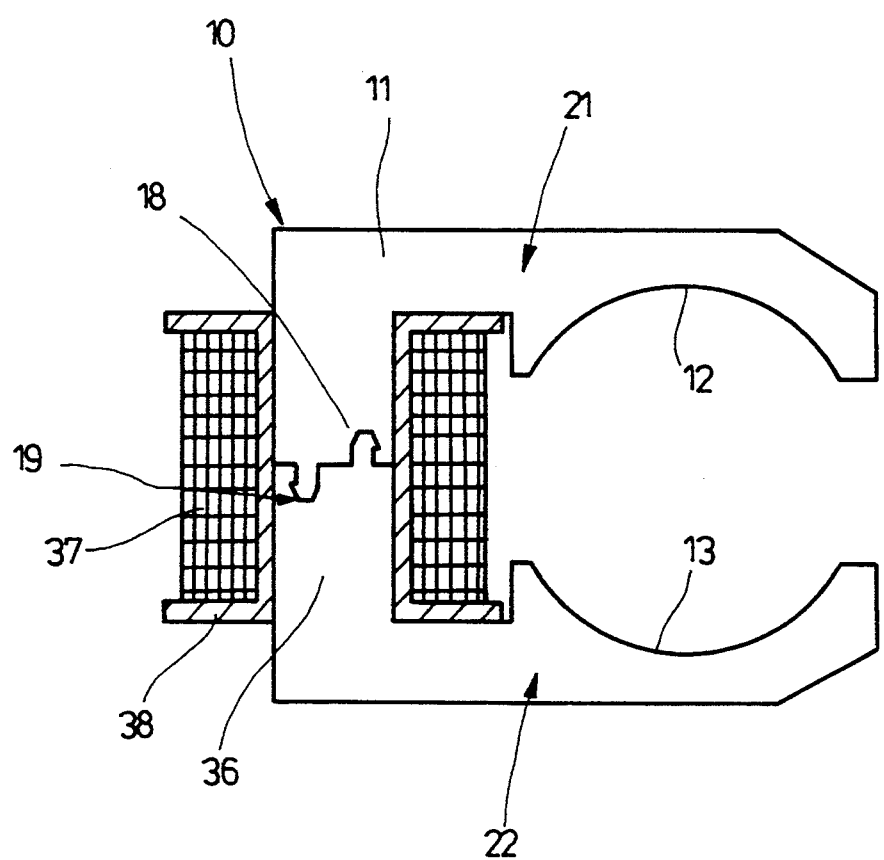

Represented diagrammatically in cross-section in FIG. 3 is a further exemplary embodiment of a stator for a bipolar low-power motor, which stator is designed asymmetrically, by contrast with the stator in FIG. 2. The sheet-metal sections of the individual laminations 11 are designed in such a way that the two magnet poles 12, 13 are joined to one another via a single limb 36, which forms the magnetic return path. Seated on this limb 36 is the stator winding, which is designed as an integral cylindrical coil 37. The cylindrical coil 37 is wound onto a coil insulating frame 38 with a hollow box profile, which encloses the limb 36. The laminate stack 10 is assembled, in turn, from the two laminate stack parts 21, 22, the two laminate stack parts 21, 22 being held together in like fashion via the two locking joints 18, 19. The two locking joints 18, 19 are arranged centrally in the limb 36 and constructed, as previously described, in like fashion. The two locking joints 18, 19 are situated next to one another at a distance in this case, specifically transverse to the direction of the lined-up arrangement of the laminations 11 and to the joining direction of the tabs and receptacles. Mounting of this stator in accordance with FIG. 3 is performed in the same way as described in relation to FIG. 2. Here, too, the need to protect the two laminate stack parts 21, 22 against axial displacement is eliminated, since any such displacement is excluded by the coil insulating frame 38 enclosing the limb 36.

Figure 6:
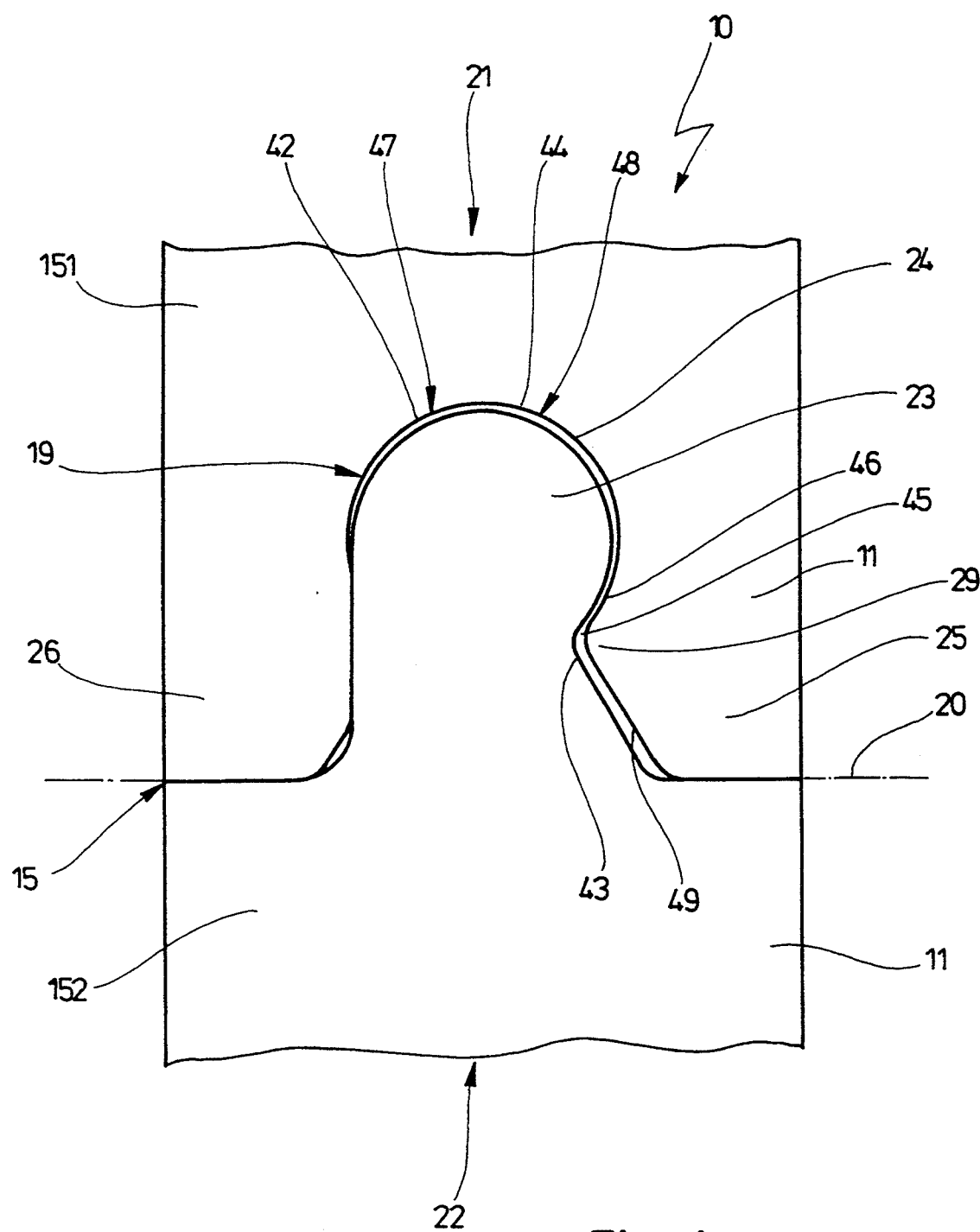
FIG. 6 is a detailed cross-section view of another embodiment of the stator showing a locking joint similar to the joint shown in FIGS. 4 and 5.

FIG. 6 represents the same section of a stator such as has been sketched in FIG. 4 and described. By contrast with FIG. 4, here the locking elements 47, 48 of the tabs 23 and receptacle 24 are modified. The locking element 47 on the tab 23 is constructed as a round head 42 with a connecting neck 43 whose transverse dimension is smaller than the largest diameter of the round head 42. The locking element 48 on the receptacle 24 is designed as a partially spherical cavity 44 which has an opening 45 which extends transverse to the plug-in direction and corresponds approximately to the transverse dimension of the connecting neck 43 of the locking element on the tab 23. The inner diameter of the cavity 44 is slightly larger than the diameter of the round head 42. When the tab 23 and tab 24 are joined together, the round head 42 and the bevels 49 constructed on the projection 29 of the sheet limb 25 press the sheet limb 25 outwards until the round head 42 engages in the circular receptacle 24. The limb 25 springs back and bears with a shoulder 46, in the shape of a circular arc, on the projection 29 of the sheet limb 25 against the round head 42 as far as the connecting neck 43. The locking joint 19 is thus produced and cannot be released again by tensile forces acting along the joining axis.

While the invention has been illustrated and described as embodied in a stator for an electric machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. Stator for an electric machine, said stator comprising a two-part stator laminate stack for mounting a stator winding, said stator laminate stack consisting of at least two laminate stack parts (21, 22) having self-centering means, said laminate stack parts each consisting of a plurality of laminations (11) and said self-centering means consisting of a plurality of locking joints (18, 19), each of said locking joints consisting of a tab (23) having a first locking element (47) integrally formed on one of the laminations (11) and a receptacle (24) with a second locking element (48) recessed in another of the laminations (11) connected to the one of the laminations (11) having the tab (23) projecting into the receptacle (24) in a plug-in direction, wherein said first locking elements (47) and said second locking elements (48) approximately transversely to respective plug-in directions so that a plurality of receptacles (24) engaged with said tabs (23) of said laminations (11) bearing against one another in an axial direction being permanently formed transversely to said plug-in direction so that contours (31) of said receptacles (24) so engaged project beyond said contours (31) of nondeformed ones of said receptacles (24) in adjacent ones of the laminations (11), said first and second locking elements (47, 48) being pretensioned for mutual gripping said first locking element (47) on each of said tabs (23) having at least one locking nose (27) projecting approximately transversely to said plug-in direction and said second locking element (48) has at least one locking shoulder (28) corresponding to said locking nose (27) on a projection (29) of said lamination (11) having said tab (23) which projects into said receptacle (24).

2. Stator according to claim 1, wherein each said first locking element consists of a round head (42) of said tab (23) connected with said one of the laminations by a connecting neck (43) whose width transverse to said plug-in direction is smaller than a largest diameter of said round head (42) and each said second locking element of said receptacle (24) engaged with said tab (23) having said round head (42) is a partially spherical cavity (44) having an opening (45) corresponding to said width of said connecting neck (43) and having a diameter greater than said largest diameter of said round head (42).

3. Stator for an electric machine, said stator comprising a two-part stator laminate stack for mounting a stator winding, said stator laminate stack consisting of at least two laminate stack parts (21, 22) having self-centering means, said laminate stack parts each consisting of a plurality of laminations (11) and said self-centering means consisting of a plurality of locking joints (18, 19), each of said locking joints consisting of a tab (23) having a first locking element (47) integrally formed on one of the laminations (11) and a receptacle (24) with a second locking element (48) recessed in another of the laminations (11) connected to the one of the laminations (11) having the tab (23) projecting into the receptacle (24) in a plug-in direction, wherein said first locking elements

(47) and said second locking elements (48) approximately transversely to respective plug-in directions so that a plurality of receptacles (24) engaged with said tabs (23) of said laminations (11) bearing against one another in an axial direction being permanently formed transversely to said plug-in direction so that contours (31) of said receptacles (24) so engaged project beyond said contours (31) of nondeformed ones of said receptacles (24) in adjacent ones of the laminations (11), at least one limb forming a magnetic return path, said locking joints being arranged in said at least one limb (36; 14, 15).

4. Stator according to claim 3, wherein each of said laminations associated with one of said laminate stack parts (21,22) has one of said tabs and one of said receptacles which in each case belong to one of two of said locking joints (18,19) and said two locking joints are located next to one another transverse to a lamination sequence in one limb (36).

5. Stator according to claim 4, wherein said stator winding comprises a cylindrical coil (37) enclosing said one limb (36) and said two locking joints (18,19) are located in a limb region enclosed by said cylindrical coil (37).

6. Stator according to claim 3, wherein each of said laminations associated with one of said laminate stack parts (21,22) has one of said tabs and one of said receptacles which in each case belong to one of two of said locking joints (18,19) and said two locking joints each are located in a separate limb (14,15).

7. Stator according to claim 6, wherein said stator winding comprises two cylindrical coils (32,33), each enclosing one of said limbs (14,15) and each of said two locking joints (18,19) is located in a limb region of one of said limbs enclosed by one of said cylindrical coils (32,33).

* * * * *